US010427802B2

(12) United States Patent
Valentini et al.

(10) Patent No.: US 10,427,802 B2
(45) Date of Patent: *Oct. 1, 2019

(54) STABILIZED AGGREGATES AND OTHER MATERIALS AND STRUCTURES FOR ENERGY ABSORPTION

(71) Applicant: Engineered Arresting Systems Corporation, Aston, PA (US)

(72) Inventors: Silvia C. Valentini, West Chester, PA (US); Shawn Patrick Doherty, Hockessin, DE (US); Youhong Li, Cherry Hill, NJ (US)

(73) Assignee: Engineered Arresting Systems Corporation, Aston, PA (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/641,986

(22) Filed: Jul. 5, 2017

(65) Prior Publication Data

US 2017/0297739 A1    Oct. 19, 2017

Related U.S. Application Data

(63) Continuation of application No. 13/604,787, filed on Sep. 6, 2012, now Pat. No. 9,802,717.

(51) Int. Cl.
*B64F 1/02* (2006.01)
*E01C 9/00* (2006.01)

(52) U.S. Cl.
CPC .............. *B64F 1/025* (2013.01); *E01C 9/007* (2013.01)

(58) Field of Classification Search
CPC .................................. B64F 1/025; E01C 9/007
See application file for complete search history.

(56) References Cited

U.S. PATENT DOCUMENTS

| 2,380,105 A | 7/1945 | Oswald |
| 3,066,896 A | 12/1962 | Schirtzinger |
| 3,494,607 A | 2/1970 | Rusch et al. |
| 3,572,465 A | 3/1971 | Olson |
| 3,659,812 A | 5/1972 | Carlsson |
| 3,867,159 A | 2/1975 | Ergene |
| 4,002,708 A | 1/1977 | Lott |
| 4,002,788 A | 1/1977 | Lott |

(Continued)

FOREIGN PATENT DOCUMENTS

| CN | 101235620 A | 6/2008 |
| GB | 1282103 | 7/1972 |

(Continued)

OTHER PUBLICATIONS

European Patent Application No. 18162492.5, Extended European Search Report dated Jun. 26, 2018.

(Continued)

*Primary Examiner* — Brian M O'Hara
(74) *Attorney, Agent, or Firm* — Kilpatrick Townsend & Stockton LLP; Dean W. Russell (57) ABSTRACT

Materials and structures for absorbing energy. The materials and structures are well suited for arresting aircraft and other vehicles, although their purposes need not be so limited. Also detailed are packaging and other solutions for maintaining system integrity, especially (but not exclusively) when foam glass or other aggregate is employed and stabilizing the location of the aggregate is desired.

10 Claims, 15 Drawing Sheets

(56) References Cited

U.S. PATENT DOCUMENTS

| | | | |
|---|---|---|---|
| 4,007,917 A | 2/1977 | Brubaker | |
| 4,073,482 A | 2/1978 | Seegmiller et al. | |
| 4,462,184 A | 7/1984 | Cunningham | |
| 4,939,037 A | 7/1990 | Freeman et al. | |
| 5,002,620 A | 3/1991 | King | |
| 5,125,196 A | 6/1992 | Moody | |
| 5,193,764 A | 3/1993 | Larratt et al. | |
| 5,607,252 A | 3/1997 | Tischer | |
| 5,620,276 A | 4/1997 | Niemerski et al. | |
| 5,789,681 A | 8/1998 | Angley et al. | |
| 5,885,025 A | 3/1999 | Angley et al. | |
| 5,902,068 A * | 5/1999 | Angley | B64F 1/025 404/34 |
| 6,174,587 B1 | 1/2001 | Figge, Sr. | |
| 6,183,835 B1 | 2/2001 | Cho et al. | |
| 6,257,802 B1 | 7/2001 | Vosbikian | |
| 6,616,752 B1 | 9/2003 | Basura et al. | |
| 6,685,387 B2 | 2/2004 | Allen et al. | |
| 6,726,400 B1 | 4/2004 | Angley et al. | |
| 6,913,643 B2 | 7/2005 | Dejaiffe | |
| 6,971,817 B2 | 12/2005 | Allen et al. | |
| 7,261,490 B2 | 8/2007 | Allen et al. | |
| 7,459,208 B2 | 12/2008 | Wang | |
| 7,597,502 B2 | 10/2009 | Allen et al. | |
| 7,695,560 B1 | 4/2010 | Buarque De | |
| 7,700,017 B2 | 4/2010 | Mccarthy et al. | |
| 7,871,702 B2 | 1/2011 | Rao | |
| 7,901,154 B2 | 3/2011 | Carr et al. | |
| 8,021,074 B2 | 9/2011 | Valentini et al. | |
| 8,047,289 B2 | 11/2011 | Rao | |
| 8,137,454 B2 | 3/2012 | Mcpherson | |
| 8,171,751 B1 | 5/2012 | Ungerleider et al. | |
| 8,296,968 B2 | 10/2012 | Hensley | |
| 8,579,542 B2 | 11/2013 | Narmo | |
| 2004/0058095 A1 | 3/2004 | Carr et al. | |
| 2004/0162210 A1 | 8/2004 | Dejaiffe | |
| 2007/0200008 A1 | 8/2007 | Rastegar et al. | |
| 2009/0250675 A1 * | 10/2009 | Cashin | E01F 13/12 256/13.1 |
| 2012/0057931 A1 | 3/2012 | Narmo | |
| 2013/0020437 A1 | 1/2013 | Valentini et al. | |
| 2015/0251773 A1 | 9/2015 | Doherty et al. | |

FOREIGN PATENT DOCUMENTS

| | | |
|---|---|---|
| GB | 2476944 | 7/2011 |
| JP | 50032532 | 3/1975 |
| JP | 07317012 | 12/1995 |
| JP | 2000001383 | 1/2000 |
| JP | 2000087307 | 3/2000 |
| JP | 2006057239 | 3/2006 |
| JP | 2007309093 | 11/2007 |
| JP | 2008057317 | 3/2008 |
| WO | 1998035099 | 8/1998 |
| WO | 2003022682 | 3/2003 |
| WO | 2011088286 | 7/2011 |
| WO | 2014039179 | 3/2014 |

OTHER PUBLICATIONS

Cellular Concrete Stops Airplanes in Their Tracks, Civil Engineering, Oct. 1998, pp. 14, 16.

Innovative Financing Backs Highway Project, Civil Engineering, Civil Engineering ASCE, New York, New York, Oct. 1, 1998, vol. 68, No. 10.

U.S. Appl. No. 13/604,787, Corrected Notice of Allowability dated Apr. 28, 2017.

U.S. Appl. No. 13/604,787, Corrected Notice of Allowability dated Jun. 6, 2017.

U.S. Appl. No. 13/604,787, Final Office Action dated Jun. 16, 2016.

U.S. Appl. No. 13/604,787, Non-Final Office Action dated Nov. 28, 2016.

U.S. Appl. No. 13/604,787, Non-Final Office Action dated Jan. 12, 2016.

U.S. Appl. No. 13/604,787, Notice of Allowance dated Apr. 10, 2017.

U.S. Appl. No. 13/604,787, Restriction Requirement dated May 9, 2014.

Barsotti et al., Developing Improved Civil Aircraft Arresting Systems, Department of Transportation Federal Aviation Administration National Academy of Science Transportation Research Board http://onlinepubs.trb.org/onlinepubs/acrp/acrp_rpt_029.pdf, Jan. 21, 2010, pp. 1-195.

Chinese Application No. 2013800463134, Office Action (and English translation) dated Dec. 28, 2015.

Japanese Application No. 2015-531080, Office Action (and English translation) dated Jan. 31, 2017.

International Application No. PCT/US2013/052445, International Preliminary Report on Patentability dated Mar. 19, 2015.

International Application No. PCT/US2013/052445, International Search Report and Written Opinion dated Dec. 2, 2013.

Smeacetto et al., Durable Glass-Ceramic Coatings for Foam Glass, International Journal of Applied Glass Science, vol. 3, No. 1, 2012, pp. 69-74.

* cited by examiner

Cast by zones

Fig. 12

Cast by zones: Truck can move across runway

Cast by Layers

Fig. 13

Cast by Layers: With or without fabric in between layers

STABILIZED AGGREGATES AND OTHER MATERIALS AND STRUCTURES FOR ENERGY ABSORPTION

CROSS REFERENCE TO RELATED APPLICATIONS

This application is a continuation of U.S. patent application Ser. No. 13/604,787, filed on Sep. 6, 2012, the entire contents of which are hereby incorporated herein by reference.

FIELD OF THE INVENTION

This invention relates to aggregates, materials, and other structures and more particularly, but not necessarily exclusively, to vehicle arresting systems in which aggregates, materials, or other structures are used to absorb energy to effect vehicle arrests.

BACKGROUND OF THE INVENTION

Commonly-owned U.S. Pat. No. 7,597,502 to Allen, et al. (the "Allen Patent"), discloses use of compressible material such as ceramic or phenolic foam or cellular concrete to assist in arresting vehicles. The compressible material may, if desired, be formed into blocks or beds of particular compressive gradient strength. Fabric, film, or other wrappings may surround at least portions of the blocks, with "[a] basic function of [the wrappings being] to aid in maintaining structural integrity" of blocks "during non-emergency conditions, while being subject to tearing, breakage or other partial or complete disintegration during an arresting incident." See Allen Patent, col. 4, 11. 43-48.

U.S. Patent Application Publication No. 2012/0057931 of Narmo (the "Narmo Application") similarly discloses use of foamed glass aggregate for vehicle arrestments. Systems of the Narmo application include beds filled with foam glass aggregate as well as "top cover[s]." As defined in the Narmo Application, a "top cover" comprises "any cover . . . which will prevent the aggregate mass [from being] contaminated or filled with air-borne particulates, subject to plant growth, or [subject to] other environmental impacts which [interfere] with the performance of the foamed glass aggregate mass." See Narmo Application, p. 2, col. 2, ¶ 0028.

SUMMARY OF THE INVENTION

Unclear is whether any "top cover" of the Narmo application will be satisfactory to maintain structural integrity of its corresponding aggregate bed. The present invention thus provides partial or complete "packaging" and other solutions for maintaining bed integrity, especially (but not exclusively) when glass or other aggregate is employed. As a non-limiting example, moldable bags may contain aggregated particles, with the bags being capable of being assembled into a bed. Alternatively, particles may be embedded in an adhesive or other binder, encased by a box, or anchored to a roof, ceiling, or other structure.

At least one version of the invention may include geotextile covers and generally vertically-extending anchors. In this embodiment, particles of foam glass or other material may form a bed covered in whole or part by a geotextile cover in the form of mesh or a net, for example. Vertical rods or other structures may serve as anchors, connecting the cover to the foundation of the bed or elsewhere as appropriate. Such anchors may be made of breakable or deformable material so as not unduly to impede vehicle arrestments.

In other versions of the invention, at least some of the particles may be placed within boxes or bags (whether moldable or not). If the bags are adhered or attached to covers and foundations of beds, the bags themselves may help anchor the covers in lieu of, or in addition to, rods or other structures. Preferred bags may be formed of open-net, frangible material, although other types of materials may be employed instead.

Whether or not bagged, aggregate may be placed within cubicles or other structures having floors and, if desired, upstanding walls. In at least some embodiments of the inventions, upper edges of walls may be folded to create flanges to facilitate attachment to covers. Such a structure reoriented one-hundred eighty degrees (i.e. positioned upside-down) may have its flanges attach to foundations. In some cases aggregate may be adhered to the floors of the cubicles or other structures.

Alternatively or additionally, loose aggregate may be mixed with adhesives or binders to form bricks or other integrated units. Such adhesives preferably are non-cementicious, with presently-preferred binders including chemically bonded phosphate ceramic (CBPC), asphalt, or polymeric mixes (e.g. epoxy) with filler components such as fly ash, slag, ground glass, etc. Sizes and shapes of the units may change as needed for satisfactory installation; the units may be stacked as part of a bed with or without gaps between them, and adjacent units may, but need not necessarily, be adhered or attached to each other. They likewise optionally may be placed within cubicles or other structures and adhered to their floors.

Moreover, any such mixing of loose aggregate and binders may occur in situ if appropriate. This sort of "cast in place" technique could expedite bed formation, with the mixing occurring on site and the mix immediately being poured (as, e.g., slurry) into beds. Thereafter, it may set or cure in the beds. Casting may occur in one or more layers, with or without fabric or other dividers between layers.

Alternate deformable materials may include other types of open-cell or closed-cell ceramics in lieu of foam glass. If needed, structures including open-cell ceramics may, for example, be coated or otherwise covered with water-impermeable (or water-resistant) material. One such coating itself may be non-porous ceramic; alternatively, other coatings or coverings may be employed. Yet another deformable material may be or include aerated autoclaved concrete (AAC), phosphate-bonded cellular composite, alkali-activated cellular fly ash, or cellular polymers.

Solar- or other-powered heating systems including heating elements, channels, conduits, or vents may be included in or adjacent to beds in certain cold climates. For airports lacking jet service (so beds will not be subject to jet blast), loose or bagged aggregate or other material may be used either without any covering or with low-strength netting or coatings. Alternatively, the aggregate or other material may be covered by asphalt—in essence as a continuation of the runway, albeit with the asphalt being of sufficiently low strength to assist in effecting vehicle arrestment as needed. Beds may be self-draining or include drain piping or tunnels and may include expansion joints if needed.

It thus is an optional, non-exclusive object of the present invention to provide energy-absorbing materials and structures.

It is another optional, non-exclusive object of the present invention to provide materials and structures for effecting vehicle arrests.

It is also an optional, non-exclusive object of the present invention to provide "packaging" and other solutions for maintaining bed integrity when aggregate is employed as energy-absorbing material.

It is a further optional, non-exclusive object of the present invention to provide techniques for casting energy-absorbing materials in place.

It is, moreover, an optional, non-exclusive object of the present invention to provide supports, cubicles, or other structures for energy-absorbing materials.

Other objects, features, and advantages of the present invention will be apparent to those skilled in the relevant art with reference to the remaining text and the drawings of this application.

DETAILED DESCRIPTION

Figure 1:
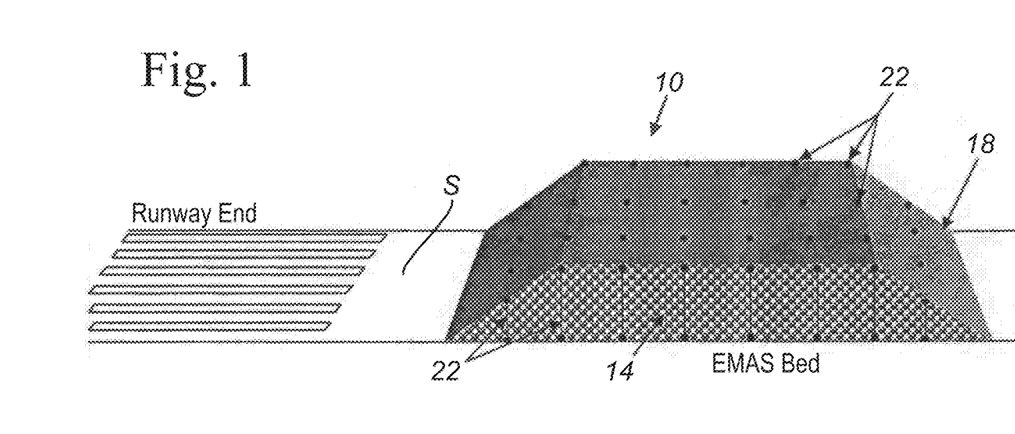
FIG. 1 is a schematicized representation of an exemplary bed of the present invention.

FIG. 1 illustrates, in schematic form, an exemplary bed 10 of the present invention. Bed 10, and any other bed mentioned herein, may extend above-grade, below-grade, or both above- and below-grade as desired. Shown in FIG. 1 is grade or surface S, with at least part of bed 10 extending above the surface S. If bed 10 is designed (at least principally) for effecting arrests of fixed-wing aircraft, surface S advantageously may be a runway or taxiway.

Bed 10 may contain at least deformable material 14, roof or cover 18, and anchors 22. Material 14 may be or comprise aggregate in the form of foam glass particles as per the Narmo application. Alternatively or additionally, material 14 may be or comprise other permanently or temporarily deformable material. Material 14 beneficially does not sustain fire, consistent with guidelines of the U.S. Federal Aviation Administration.

Absent cover 18, at least some material 14 forming bed 10 may be exposed to jet blast, wind, or other conditions that may cause scattering of the material 14. Accordingly, cover 18 may serve to confine material 14 existing at or above grade. Cover 18 beneficially is deformable when subjected to weight of a to-be-arrested vehicle; a presently-preferred—but not exclusive—form of cover 18 may be a geotextile such as a plastic net whose mesh is smaller than the majority of any loose particles forming material 14.

Figures 14A, 14B, 14C:
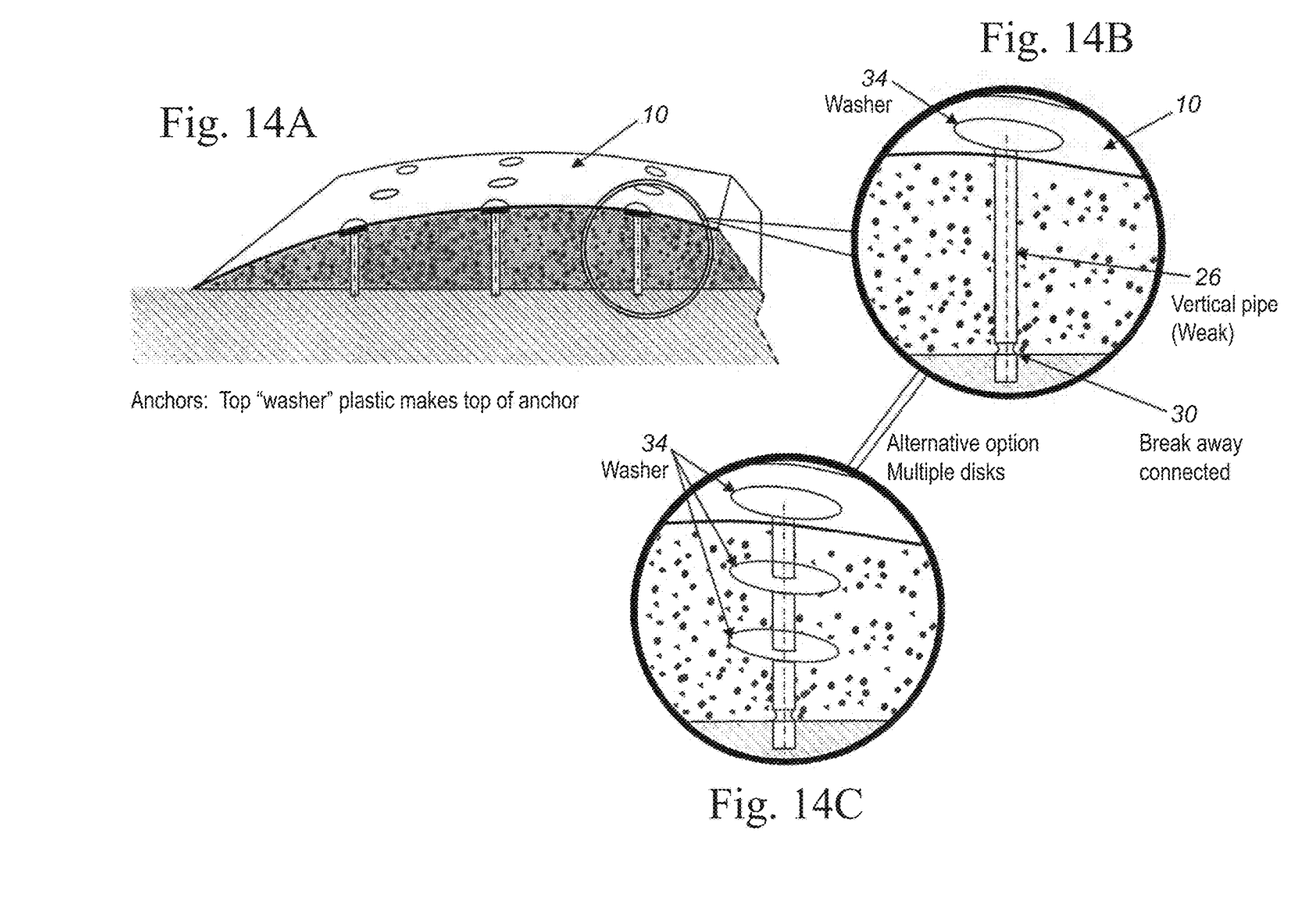
FIGS. 14A-C are schematicized views of exemplary components of a bed of the present invention.

One or more anchors 22 may serve to secure cover 18 in position relative to material 14. Anchors 22 may attach or adhere to cover 18 and extend generally vertically through bed 10 to the ground or other foundation supporting bed 10, mooring the cover 18 to the foundation. As depicted in FIGS. 14A-C, possible anchors 22 may comprise lengths of plastic pipe 26 and optional quick-release or breakaway connectors 30 and discs 34. Pipe 26 preferably deforms when subjected to weight of a to-be-arrested vehicle so as not to impede an arrest, while discs 34, if present, may help stabilize anchors 22 from moving inside the aggregate due to vibrations or other forces.

Figure 2:
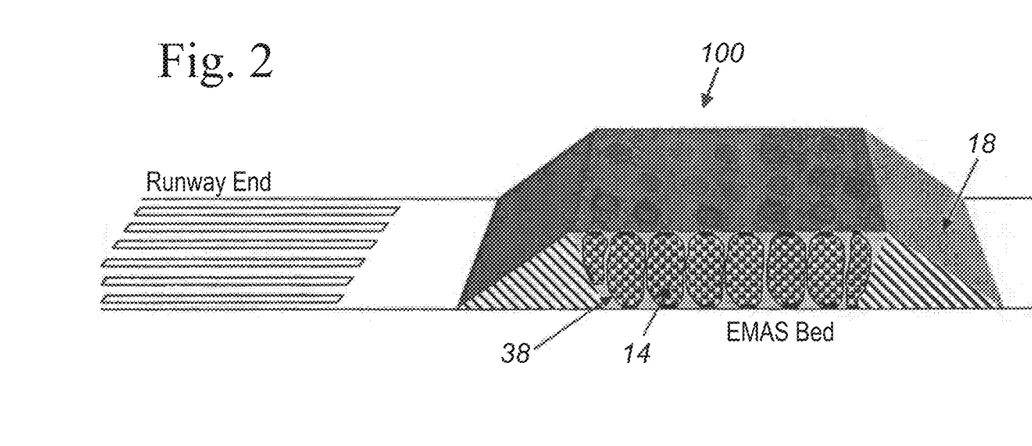
FIG. 2 is a schematicized representation of an exemplary bed of the present invention.

Illustrated in FIG. 2 is an alternate bed 100 of the present invention. Like bed 10, bed 100 may include material 14 and cover 18. It likewise may include anchors 22 if desired. Unlike bed 10, however, bed 100 may include bags 38, boxes, or other containers of material 14 rather than, or in addition to, loose aggregate. Containing material 14 in this manner should reduce sliding or other undesired movement of the material 14. Moreover, if bags 38 extend from the foundation of bed 100 to cover 18, as shown in FIG. 2, they may be adhered or attached to the foundation and cover 18 as additional or alternative anchors. Although FIG. 2 illustrates each bag 38 as extending the height of bed 100, multiple shorter bags 38 may be connected together to extend over that height instead.

Figure 3:
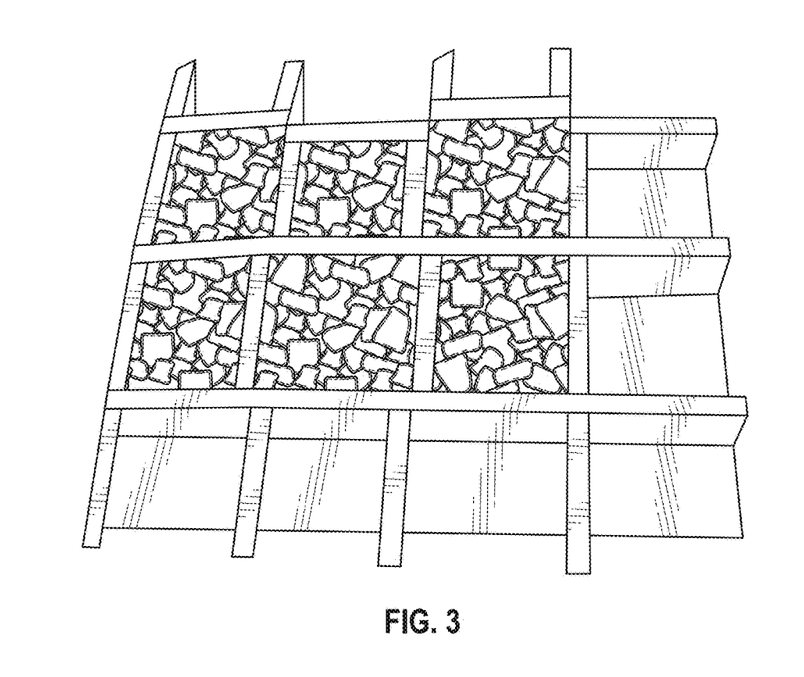
FIG. 3 is a mock-up of exemplary components of a bed of the present invention.
Figures 3A, 3B:
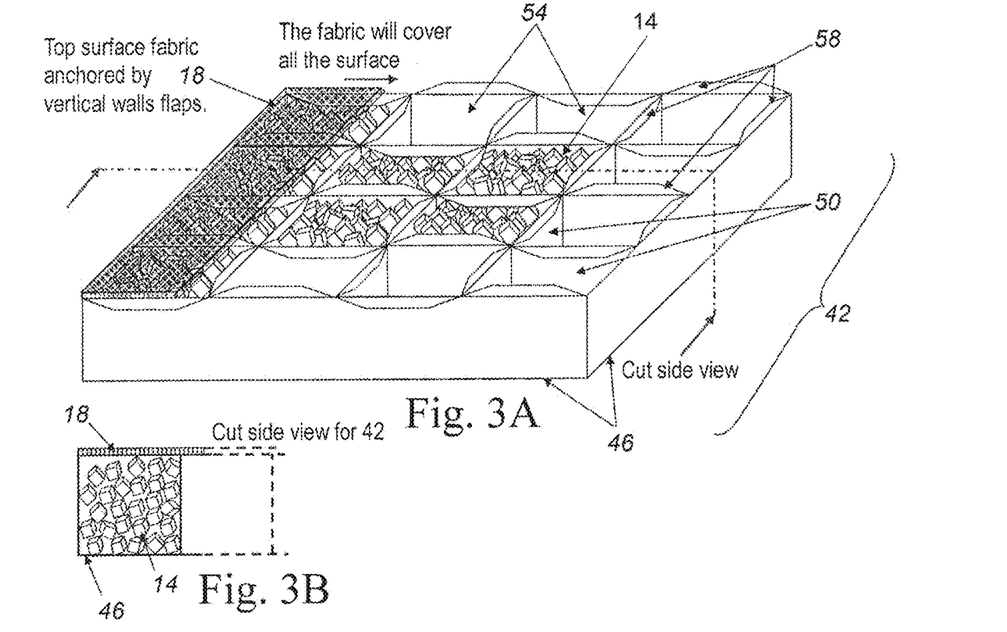
FIG. 3A is a perspective view of exemplary components of a bed similar to those of FIG. 3.
FIG. 3B is a cross-sectional view of bed components of FIG. 3A.
Figure 4:
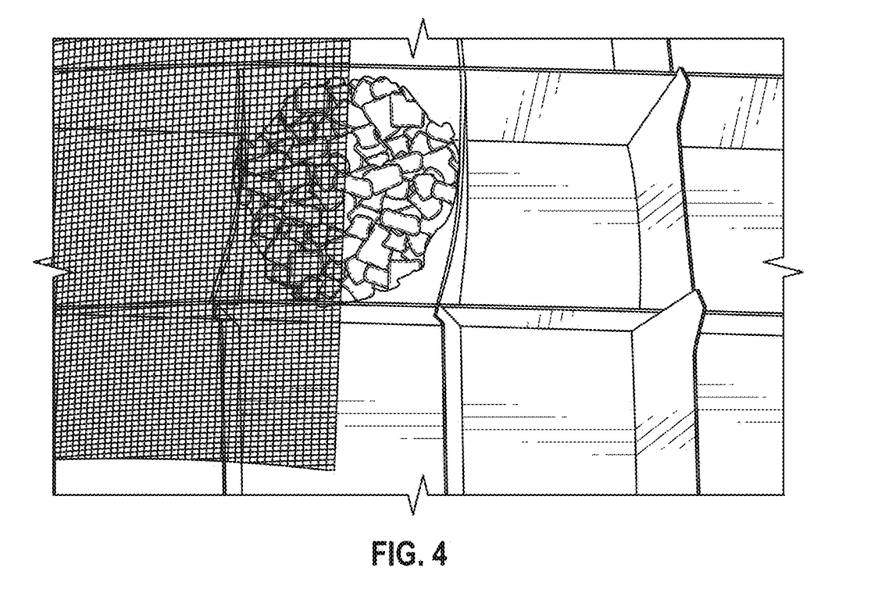
FIG. 4 is a mock-up of exemplary components of a bed of the present invention.
Figure 4A:
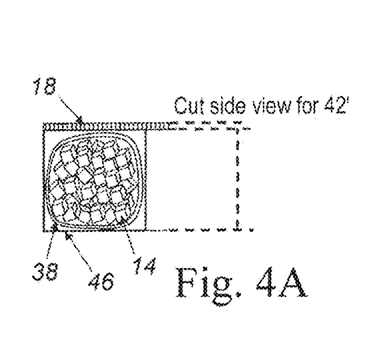
FIG. 4A is a cross-sectional view of bed components similar to those of FIG. 4.

FIG. 3 details a mock-up of an exemplary support structure 42 for material 14. Structure may include base 46 and upstanding walls 50, the latter of which intersect to form cubicles 54. Loose aggregate of material 14 may be placed within the cubicles 54 to reduce further opportunity for the material 14 to move undesirably within a bed. Additionally, walls 50 may include flanges 58 to facilitate attachment to cover 18. FIG. 4 illustrates a similar structure 42' in which material 14 is contained both within a bag 38 and a cubicle 54, the combination of which yet further reducing undesired movement of the material 14 within a bed.

Figure 5:
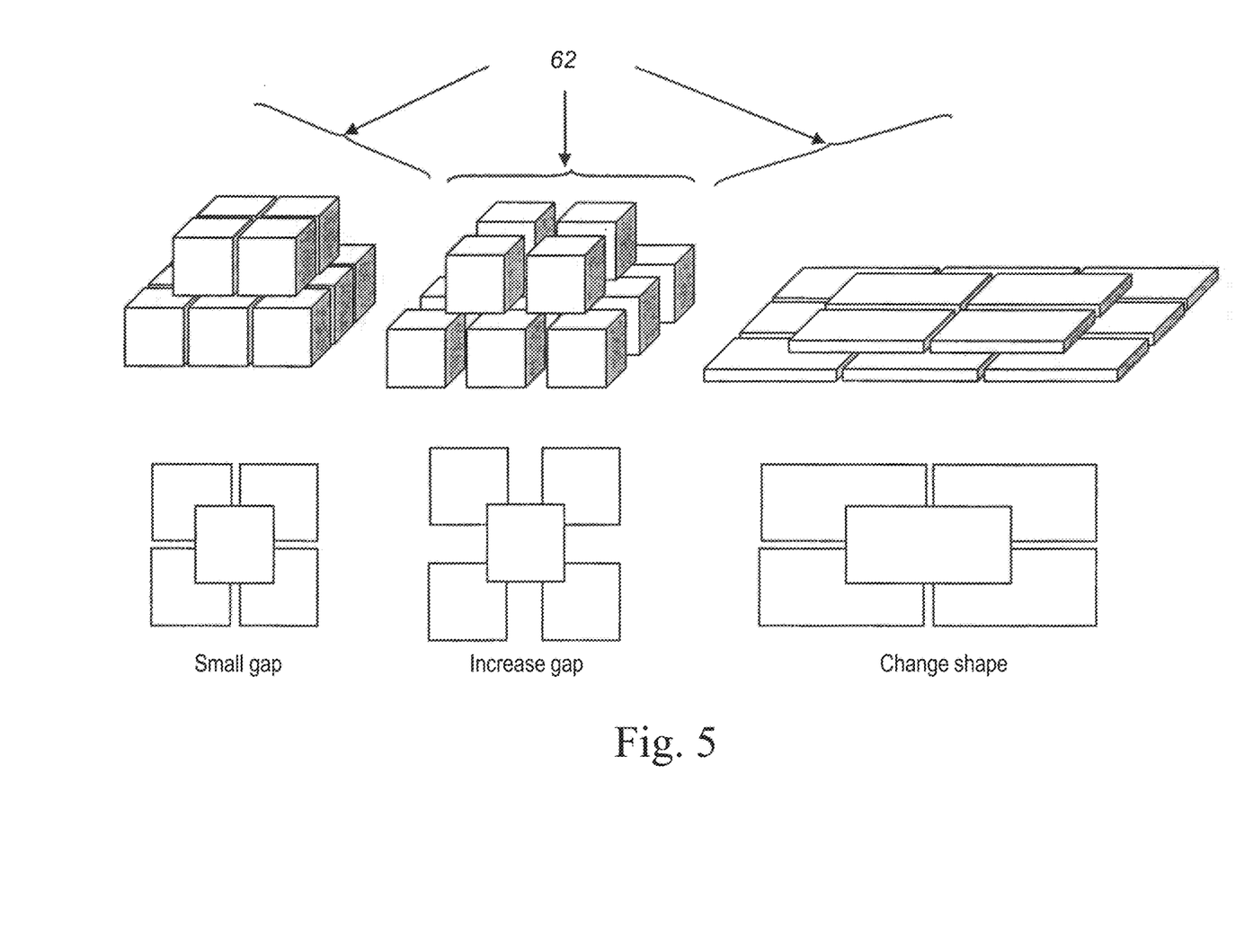
FIG. 5 is a schematicized representation of exemplary components of a bed of the present invention.

Material 14 may comprise a mixture of, for example, aggregate and binder solidified to form an integrated brick, block, or unit 62. Alternatively, material 14 may be glued or otherwise adhered to base material 66 to form an integrated unit 62' (see FIG. 6). In either circumstance, units 62 (or 62') may be stacked as part of a bed, without or without gaps between individual units 62 (or 62'). FIG. 5 shows units 62 stacked with gaps. Although two rows of units 62 are illustrated, more or fewer may be included in a bed. Similarly, although multiple units 62 of uniform size and shape are depicted in FIG. 5, size or shape (or both) of an individual unit 62 may differ from that or those of adjacent or nearby units 62. Units 62 also may be adhered or attached to one another at points of contact, although such adhering or attaching is not mandatory.

Figure 6:
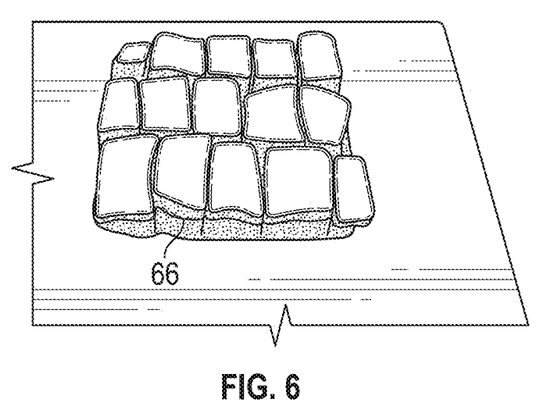
FIG. 6 depicts an exemplary loose material adhered with or to a binder or support to form a unit.
Figure 6A:
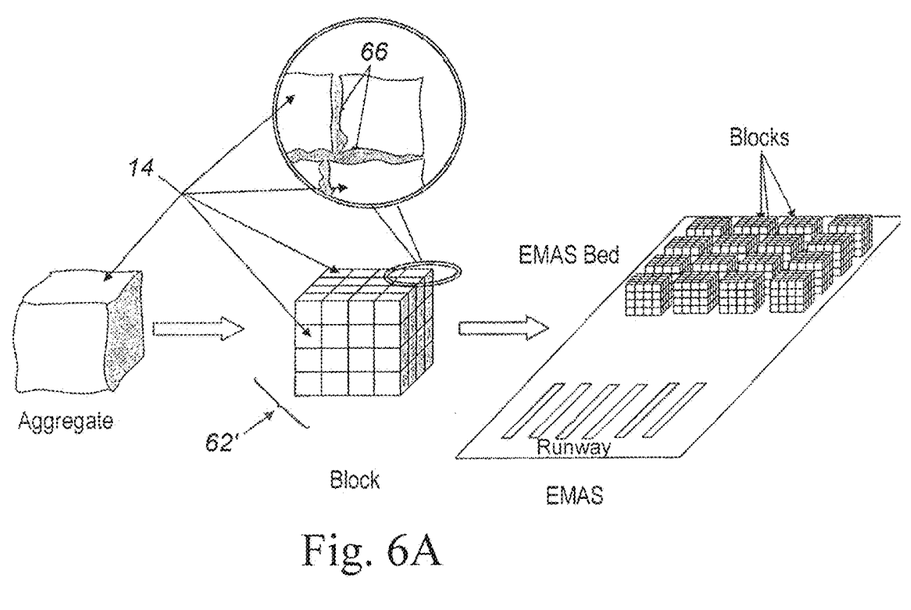
FIG. 6A provides another depiction similar to FIG. 6.
Figure 7:
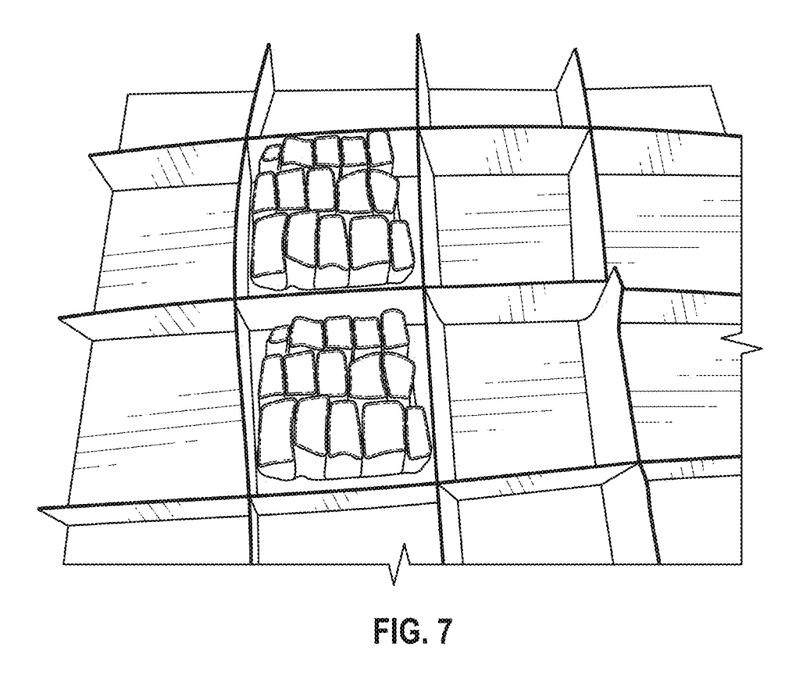
FIG. 7 depicts an exemplary loose material adhered with a binder and positioned within a cubicle.
Figure 7A:
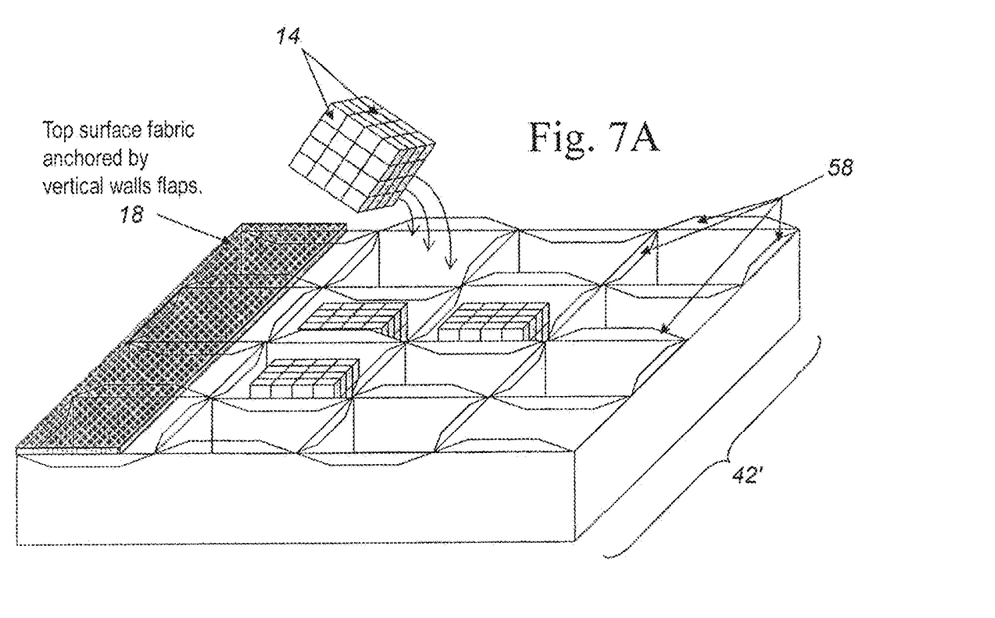
FIG. 7A provides another depiction similar to FIG. 7.

In one version of unit 62' of FIG. 6, material 14 preferably is foam glass, while base material 66 preferably is asphalt. Of course, persons skilled in the art will recognize that other materials may be used instead. Because even units 62 and 62' may be further confined to maintain bed integrity, FIG. 7 shows exemplary units 62 within cubicles 54 of support structure 42'.

Figure 8A:
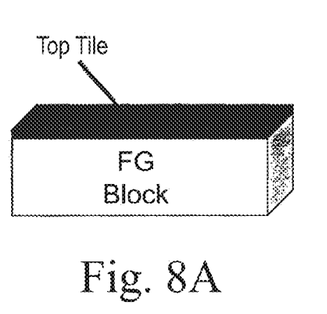
FIGS. 8A-B are schematicized representations of a unit including (only) an upper covering or coating (FIG. 8A) or both upper and side coverings or coatings (FIG. 8B).
Figure 8B:
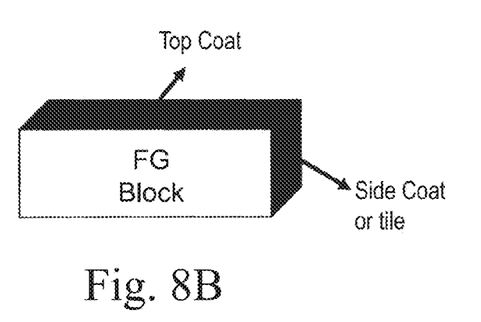

Units 62 or 62' may be coated on any or all of top, side, or bottom surfaces to improve various characteristics (see FIGS. 8A-B). In particular, waterproofing coatings may be beneficially added to units 62 or 62'. Such coatings could be ceramics, plastics, or otherwise as appropriate. Alternatively, wafers of such materials may be adhered or attached to the units. Indeed, foam glass itself (albeit preferably of higher density) could be used as a ceramic coating or wafer.

Figure 9:
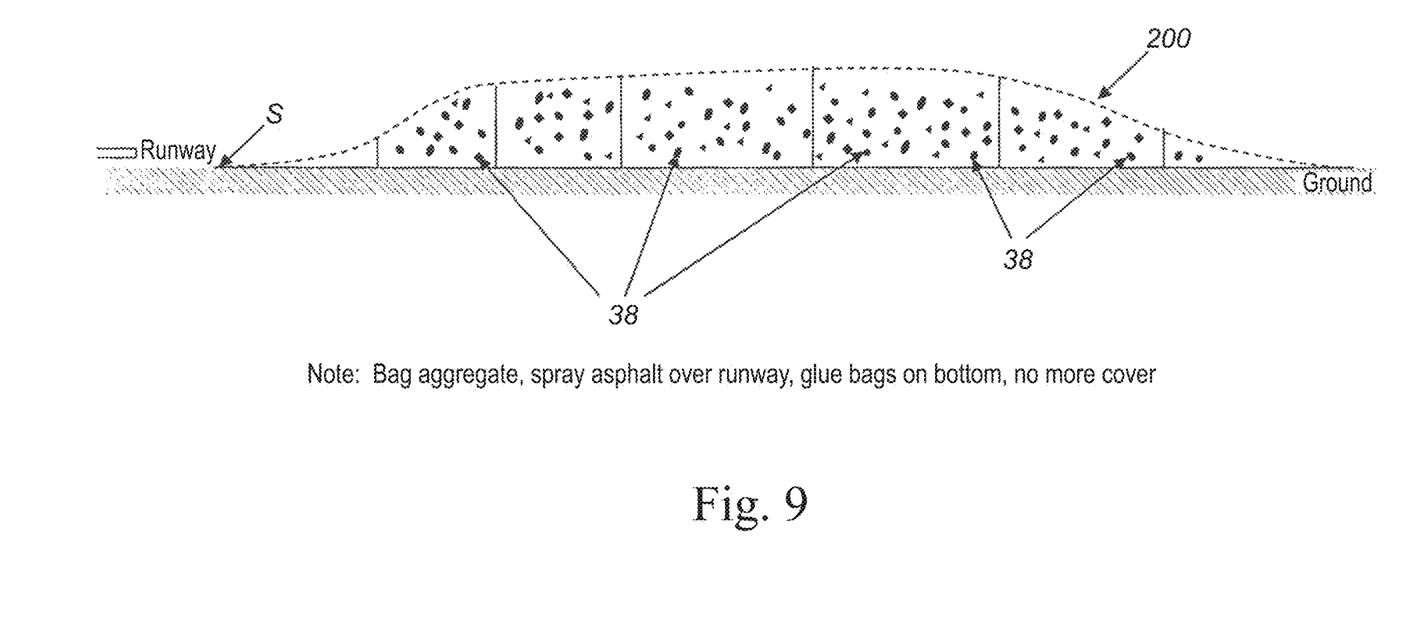
FIG. 9 is a schematicized representation of a third exemplary bed of the present invention.

FIG. 9 depicts yet another bed 200 lacking any cover 18. Rather, bed 200 may be formed by spreading asphalt across surface S and adhering material 14 or containers thereof such as bags 38 to the asphalt. Although cover 18 is not required in connection with bed 200, it nonetheless may be present if desired.

Figure 10A:
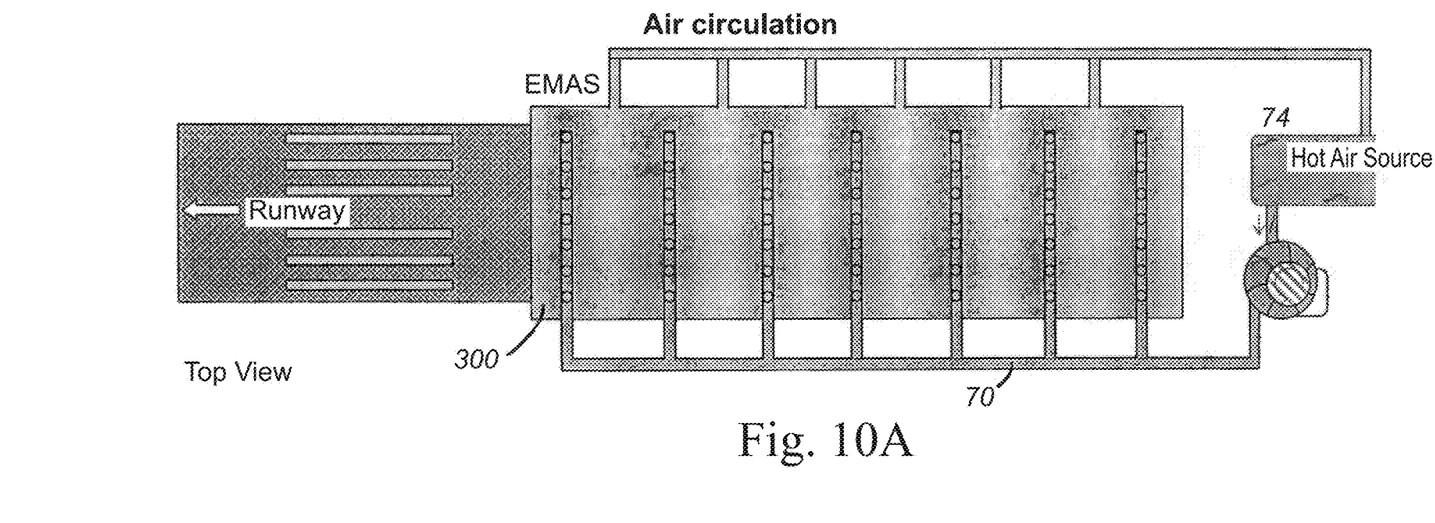
FIGS. 10A-B are schematicized top (FIG. 10A) and plan (FIG. 10B) views of an exemplary bed of the present invention.
Figure 10B:
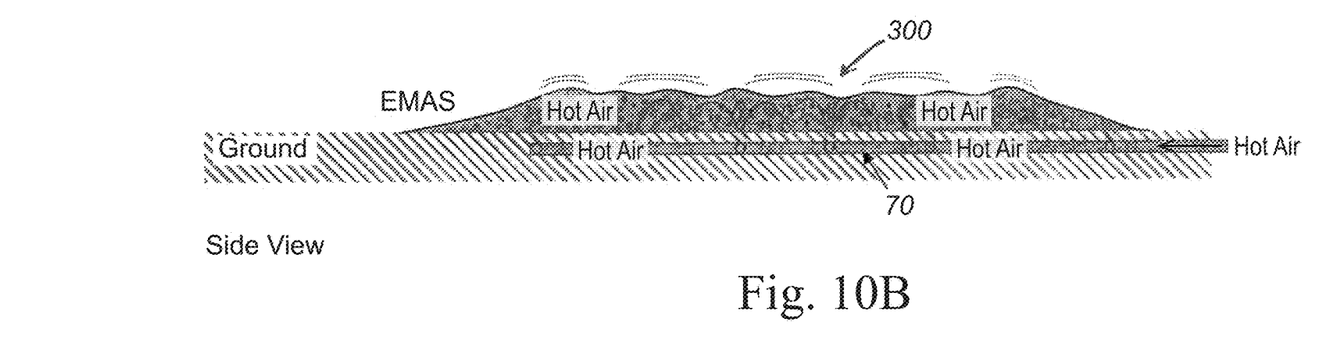
Figure 11A:
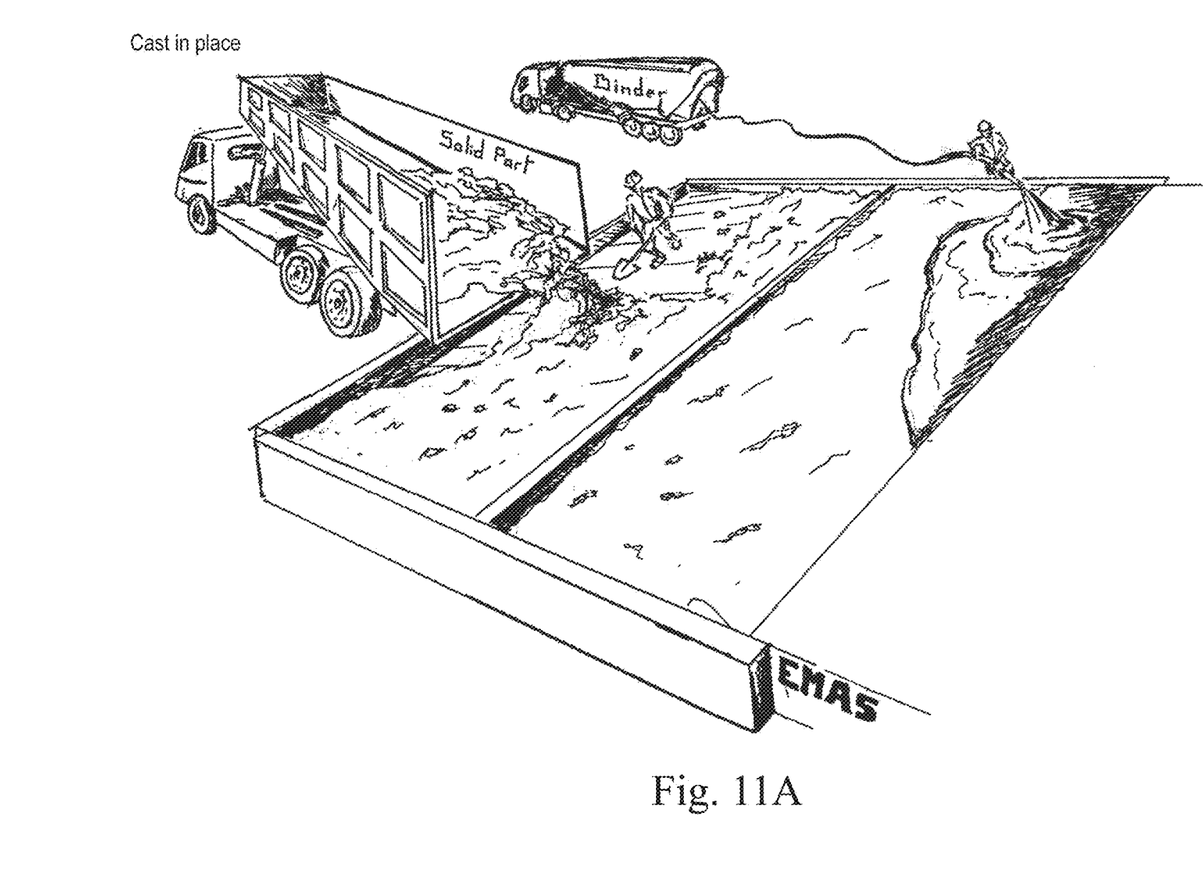
FIGS. 11A-B and 12-13 are schematicized views of exemplary techniques for casting materials in place.
Figure 11B:
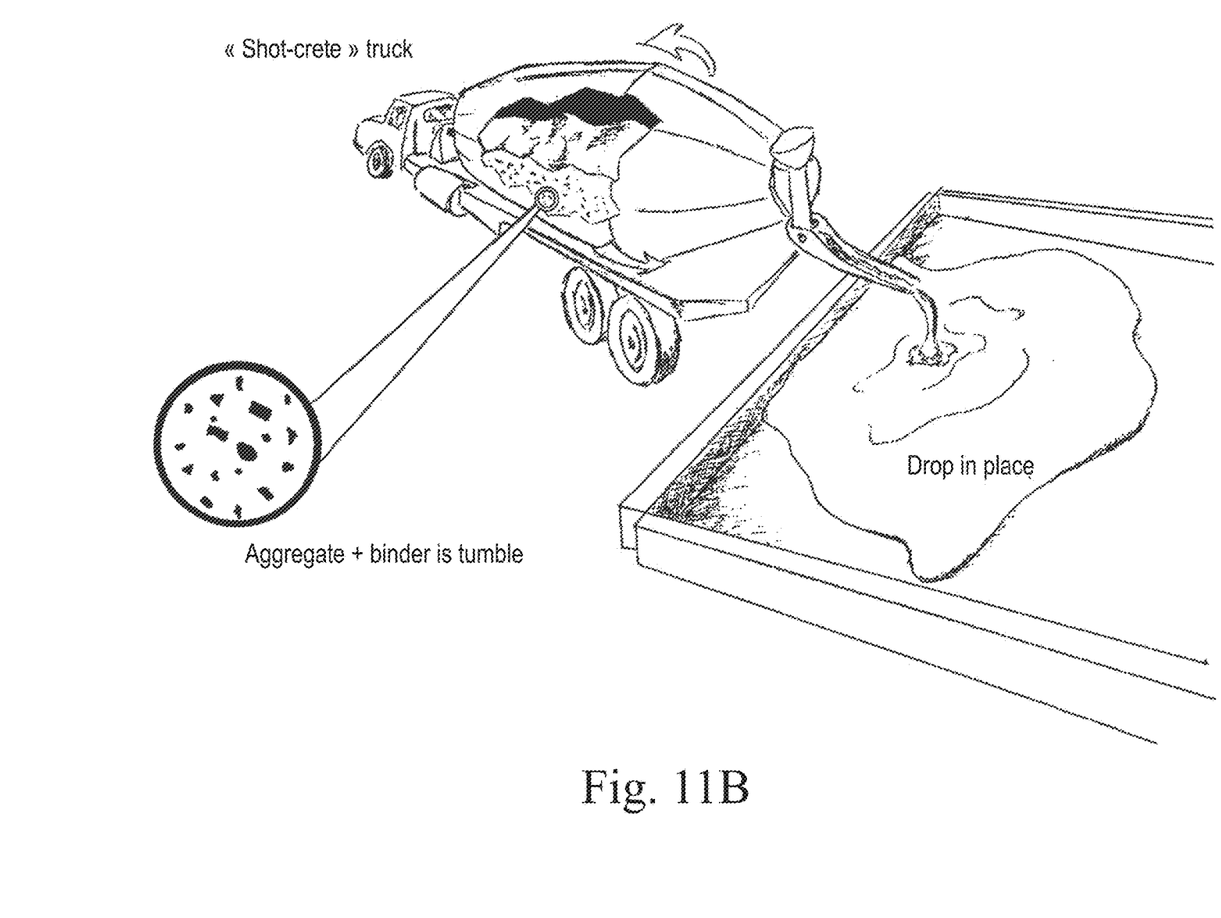
Figure 12:
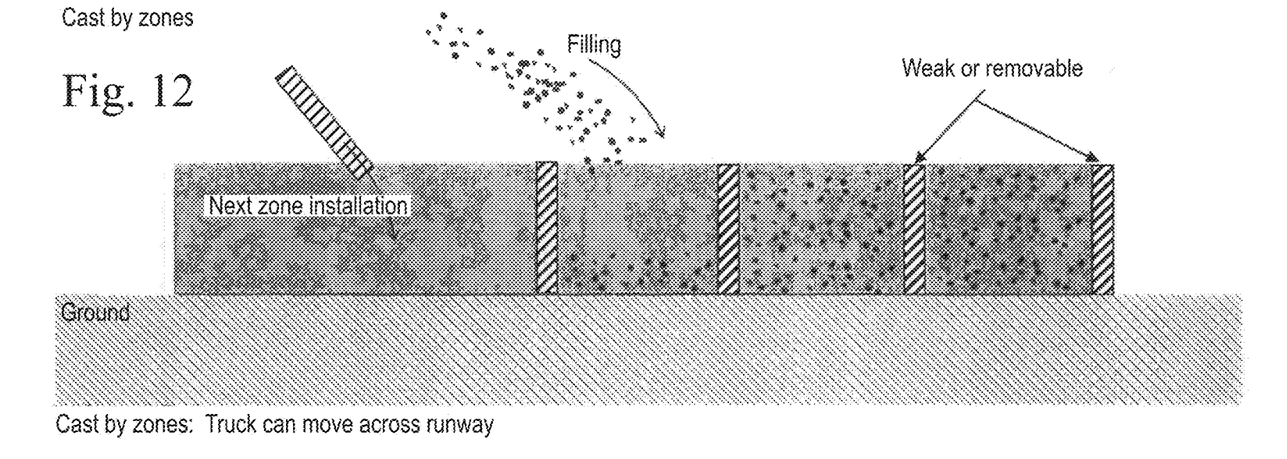
Figure 13:
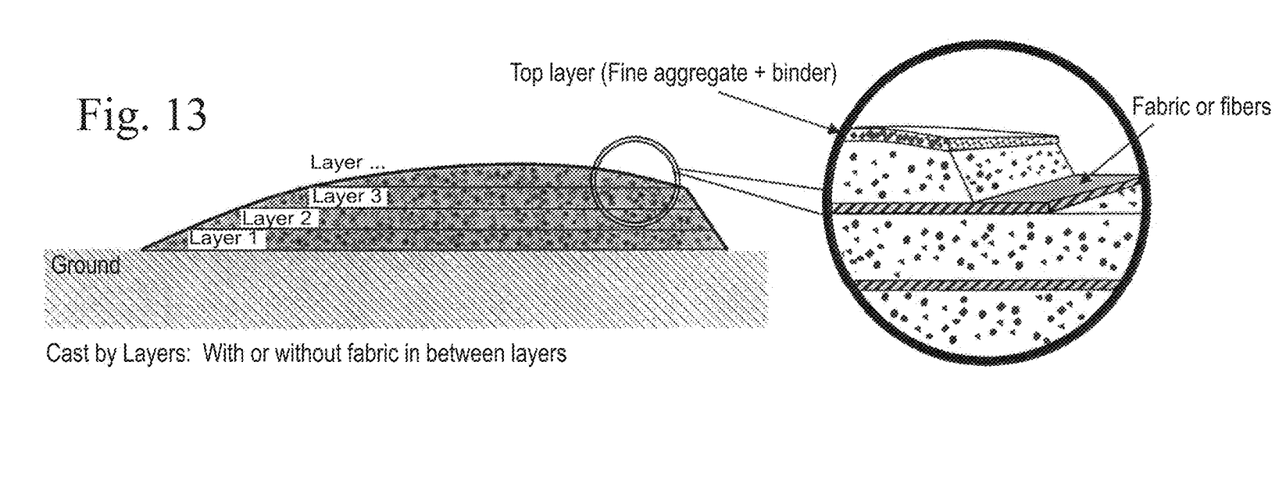

FIGS. 10A-B schematically depict bed 300. In addition to material 14, bed 300 may include elements or components for its heating. These elements or components may be especially beneficial when bed 300 is installed in cold climes, as extreme temperatures conceivably could impact performance characteristics of the bed 300.

Any type of heating may be utilized with bed 300. FIGS. 10A-B, however, illustrate one exemplary technique for non-electrical heating of the bed 300. Consistent with this technique, one or more pipes 70 with vents could be installed in a foundation and communicate with a source 74 of forced hot air. As the forced hot air moves through the pipes, it heats bed 300 from the foundation upward (as the hot air exiting the vents rises). Accumulated snow and ice melted by the hot air may then travel downward and exit the area of bed 300 by suitable sloping of the surrounding terrain. If material 14 is not sealed, the hot air may exit bed 300 via fissures or gaps in the material 14. By contrast, if material 14 is sealed, an exit might need to be created for the hot air.

Rather than bagging, boxing, or otherwise containing material 14 in advance of forming a bed, material 14 may be cast in place in some instances. FIGS. 11A-B and 12-13 schematically illustrate some casting-in-place methods, with slurries of material 14 being dumped or sprayed into a bed, for example. In any of these methods, material 14 may be fixed into a monolithic structure, or formed into multiple layers, or formed into multiple blocks, or otherwise formed, with or without fibers, fabric, or other materials or substances interspersed therein.

The foregoing is provided for purposes of illustrating, explaining, and describing embodiments of the present invention. Further modifications and adaptations to these embodiments will be apparent to those skilled in the art and may be made without departing from the scope or spirit of the invention. Indeed, multiple revisions may be made to embodiments identified in this application consistent with the concepts of stabilizing materials used as part of vehicle-arresting systems. Any terms of direction and relative positioning (e.g. upper, lower, upward, etc.) are used to identify nominal or preferred, rather than absolute, relationships of components and may be modified as appropriate. Finally, the contents of the Allen Patent and the Narmo Application are incorporated herein in their entireties by this reference.

What is claimed is:

1. A method of forming a structure for arresting aircraft as an extension area of a runway, comprising:
   a. positioning a plurality of anchors in the extension area;
   b. attaching at least one net to the plurality of anchors;
   c. positioning loose aggregate so that its location in the extension area is stabilized at least in part by the plurality of anchors and the at least one net;
   d. introducing into the extension area a first material different than the loose aggregate; and
   e. coating at least the first material with a water-resistant material.

2. A method according to claim 1 in which the first material is cementitious.

3. A method according to claim 1 in which the net is plastic.

4. A method according to claim 1 in which the net is plastic whose mesh is smaller than a size of a majority of particles of the loose aggregate.

5. A method according to claim 1 in which the loose aggregate comprises foam glass.

6. A method according to claim 1 in which the anchors are oriented generally vertically.

7. A method according to claim 1 in which the step of positioning loose aggregate comprises casting the loose aggregate into the extension area.

8. A method according to claim 1 in which the step of introducing into the extension area a first material comprises casting the first material into the extension area.

9. A method of forming a structure for arresting aircraft as an extension area of a runway, comprising:
   a. positioning a plurality of anchors in the extension area;
   b. attaching at least one plastic net to the plurality of anchors;
   c. positioning loose aggregate so that its location in the extension area is stabilized at least in part by the plurality of anchors and the at least one plastic net, (i) the plastic net having mesh smaller than a size of a majority of particles of the loose aggregate and (ii) the loose aggregate comprising foam glass;
   d. casting into the extension area a cementitious material; and
   e. coating at least the cementitious material with a water-resistant material.

10. Energy-absorbing material for arresting an aircraft travelling along a surface of a runway, comprising:
    a. loose aggregate (i) structured to deform so as to absorb energy and (ii) extending both above and below the surface of the runway; and
    b. a stabilizer for stabilizing a location of the loose aggregate so as to form a bed extending both above and below the surface of the runway, the stabilizer stabilizing comprising (i) an anchor assembly comprising at least one anchor extending at least partly through the bed and (ii) a plastic net (A) covering the loose aggregate, (B) being attached or adhered to the anchor, and (C) having mesh smaller than a size of a majority of particles of the loose aggregate.

* * * * *